(12) United States Patent
Luken et al.

(10) Patent No.: US 12,227,220 B1
(45) Date of Patent: Feb. 18, 2025

(54) REPLACEMENT SPREADER TAILGATE REMOVAL, STORAGE, REINSTALLATION APPARATUS

(71) Applicants: John Gary Luken, Cincinnati, OH (US); Anthony Thomas Luken, Lockland, OH (US)

(72) Inventors: John Gary Luken, Cincinnati, OH (US); Anthony Thomas Luken, Lockland, OH (US)

( * ) Notice: Subject to any disclaimer, the term of this patent is extended or adjusted under 35 U.S.C. 154(b) by 0 days.

(21) Appl. No.: 18/474,180

(22) Filed: Sep. 25, 2023

(51) Int. Cl.
*B62B 5/04* (2006.01)
*B60P 1/267* (2006.01)

(52) U.S. Cl.
CPC .............. *B62B 5/04* (2013.01); *B60P 1/267* (2013.01)

(58) Field of Classification Search
CPC .................................. B60P 1/267; B62B 5/04
See application file for complete search history.

(56) References Cited

U.S. PATENT DOCUMENTS

| | | | |
|---|---|---|---|
| 6,666,491 B2 * | 12/2003 | Schrafel .................... | B60P 1/26 298/23 S |
| 2009/0255887 A1 * | 10/2009 | Mrowiec .................. | E01F 9/70 211/85.8 |
| 2012/0056011 A1 * | 3/2012 | Hollinrake ............ | E01H 10/007 239/172 |

* cited by examiner

*Primary Examiner* — Moshe Wilensky

(57) ABSTRACT

A spreader tailgate removal, storage, and reinstallation apparatus and method are disclosed for safety and efficiency of changing and storing replacement spreader tailgates. The apparatus includes a prop for holding the spreader tailgate away from a dump body and a cart to receive, hold, or stage the spreader tailgate for removal, storage, or reinstallation respectively.

14 Claims, 6 Drawing Sheets

Figures

REPLACEMENT SPREADER TAILGATE REMOVAL, STORAGE, REINSTALLATION APPARATUS

CROSS REFERENCE TO RELATED APPLICATIONS

None

BACKGROUND OF THE INVENTION

Field of the Invention

The present invention and method relate to hand carts with at least two axes, vehicles transporting loads, and means for controlling the movement of a tailboard.

Background

Replacement spreader tailgates, hereafter "spreader tailgates", are mounted to a dump body and used for highly specific tasks including but not limited to road maintenance in wintry conditions. The spreader tailgate is heavier and more valuable than a standard tailgate. Therefore, the spreader tailgate is not continuously required or desired to be mounted to the dump body.

Prior art for the invention and method are generally labor intensive and require extraneous equipment as described hereafter. The spreader tailgate is hoisted or lifted on and off the dump body by attaching a chain, wire rope, etc. to a loop or through a hole or holes on or in the tailgate spreader tailgate and raising the chain, wire rope, etc. with a machine or piece of equipment. The spreader tailgate is then placed on the ground or on a stand, cart, or rack. Manual manipulation and lifting of the spreader tailgate are performed, although infrequently, to remove, store, or reinstall the spreader tailgate.

Problems identified in the prior art are as follows. Lifting or hoisting the spreader tailgate requires extraneous and often expensive equipment. Manual manipulation requires intense labor and numerous laborers each experiencing high exposure to pinch and crush points.

Prior art for holding a spreader tailgate away from the dump body while supported by the pivot feature at the top of the spreader tailgate includes the use of locking hydraulic cylinders as in U.S. Pat. No. 6,666,491 which are primarily used for refuse trucks and other trucks in which the load is forced out instead of dumped. This solution requires a complication of the dump body system and is, therefore, undesirable because of cost and added maintenance in this case.

BRIEF SUMMARY OF THE INVENTION

The present invention relates to a spreader tailgate removal, storage, and reinstallation apparatus and method for use thereof. The apparatus includes a cart and a prop. The apparatus is used in conjunction with a dump body and a spreader tailgate such as the system described in U.S. Pat. No. 8,028,938 or a hydraulically driven system of different materials known in the field. The present invention is described in general terms as follows.

The cart receives, holds, and stores the spreader tailgate. The cart comprises a base with wheels and at least one support shelf or support arm which contacts the spreader tailgate and holds it in a desired position. The wheels mounted to the bottom of the cart allow for transportation and positioning of the cart during the removal, storage, or reinstallation methods. The cart of the present invention is equipped with additional features for safety and ease of use including a tie down member extending from the cart base primarily in the vertical direction to a height near the height of the installed spreader tailgate such that a tie down means can be used to secure the spreader tailgate to the cart, a means for storing and protecting hydraulic or other lines from damage, a means for inhibiting movement of the cart, and a means for grasping to push or pull the cart to a desired position. Further, the cart of the present invention may also have at least one cantilevered support shelf or support arm to accommodate equipment suspended beneath the spreader tailgate.

The prop holds the tailgate away from the dump body regardless of the position of the dump body. The prop is a member comprised with two ends. The first end having a means to constrain the member to the dump body. The second end having a means to constrain the member to the spreader tailgate. The means of constraint for the first end in the present invention is a male protrusion of sufficient geometry to be received in a tailgate latch mechanism at the bottom of the dump body. The means of constraint for the second end in the present invention is a female indentation, hole, or protrusion of sufficient geometry to accept a pin at the bottom of the spreader tailgate.

The method for removal, storage, or reinstallation of the spreader tailgate is dependent upon a functioning hoist configured to radially position the dump body about a hinge near the rear end of the dump body on a chassis. To remove the spreader tailgate, the hoist and dump body are raised, with the tailgate latch mechanism unlocked, until the spreader tailgate swings free from the dump body only supported by a pivot mechanism at the top of the dump body rear. While the bed is in the raised position the prop is inserted to constrain the spreader tailgate in this position relative to the dump body. The dump body is lowered, and the cart is positioned beneath the spreader tailgate. Once in position, the bed is raised until the spreader tailgate contacts the cart. The spreader tailgate top pins are removed, and the prop is removed. The cart is then wheeled to a storage location and the dump body can be positioned as desired.

To reinstall the spreader tailgate, the dump body is raised, and the cart is wheeled into position. The spreader tailgate pins are installed, and the dump body is lowered. The cart is removed, and the dump body can be positioned as desired.

DETAILED DESCRIPTION OF THE INVENTION

Figure 1:
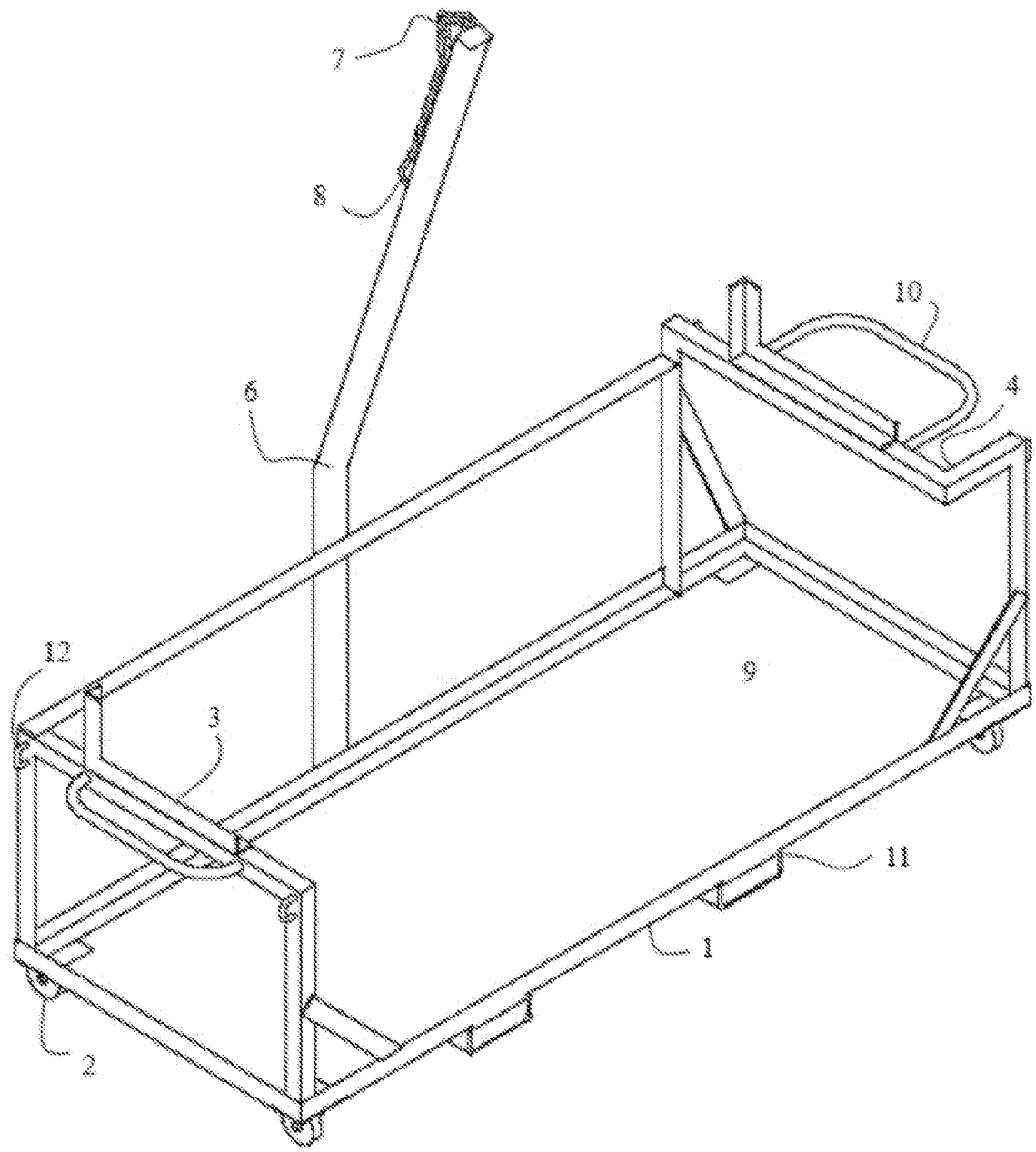
FIG. 1 is a perspective view of the cart of the present invention.

With reference to FIG. 1, the cart of the preferred embodiment of present invention includes a base 1 which is wider than the width of the tailgate and deeper than the thickest point of the tailgate to provide stability during use. In the disclosed preferred embodiment of the present invention, there are caster wheels 2 with a locking mechanism 22, see FIG. 4, to prevent undesired motion of the cart when engaged rotatably disposed beneath the base 1 at the corners which allow near direct movement of the cart to any point in a horizontal plane. Further, the preferred embodiment of the present invention includes two support arms 3 one near each end of the cart with features constraining the movement of the spreader tailgate along the width of the cart and away from the dump body 16. One of the support arms 3 is a cantilevered arm 4 on one side to allow the cart to roll past a salt spinner 5, see FIG. 5, which is disposed pivotably beneath the spreader tailgate 15. The cantilevered arm 4 could be located in numerous positions or configurations to accommodate almost any accessory equipment or protrusion disposed beneath the spreader tailgate 15, see FIG. 3.

Figure 3:
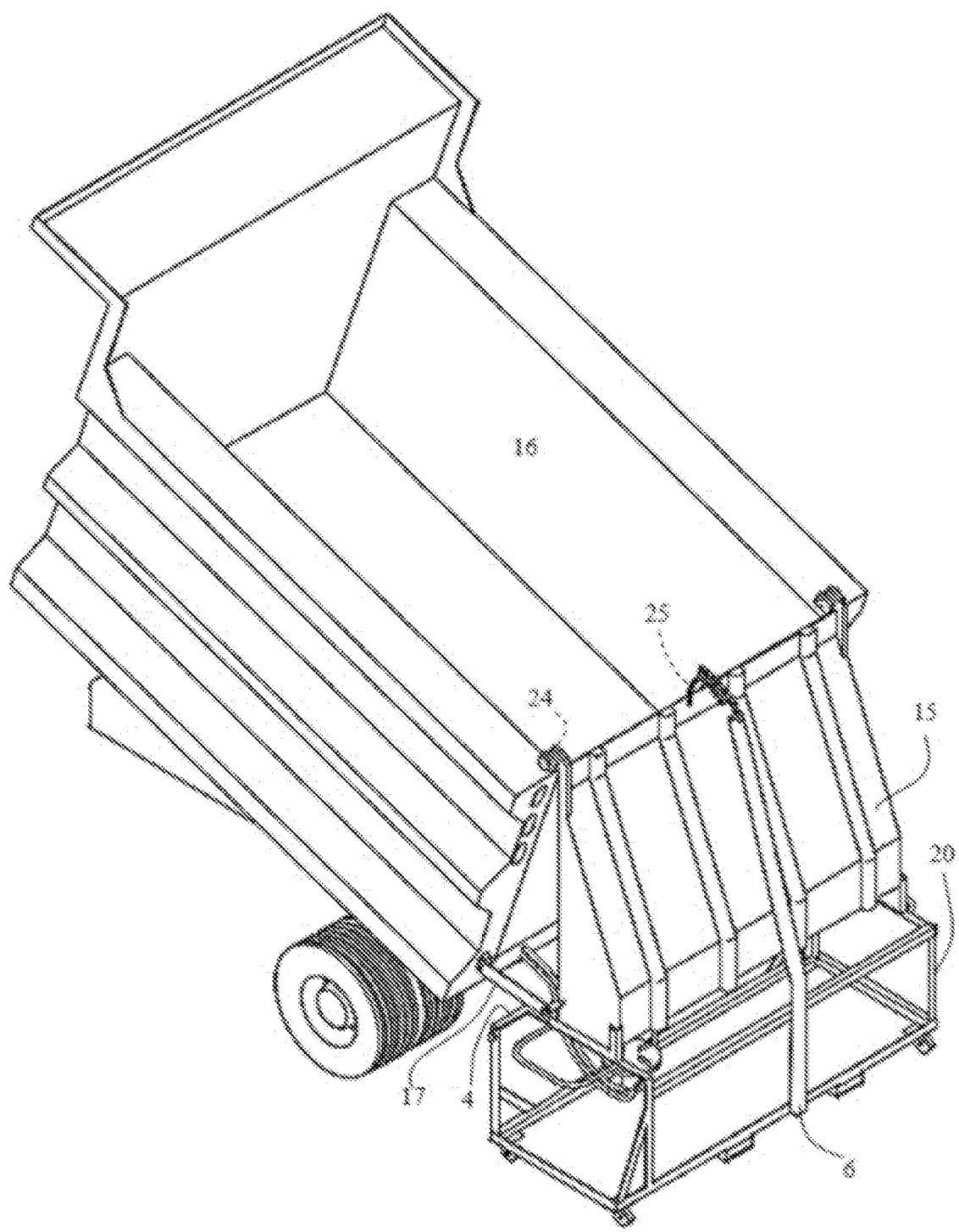
FIG. 3 is a perspective view of the cart, prop, spreader tailgate, and dump body.

With further reference to FIG. 1, the preferred embodiment of the present invention also includes a tie down member 6 near the middle of the cart which extends first vertically from near the middle of the width of the cart then obliquely toward a position near the top of the middle of the spreader tailgate 15, see FIG. 3, when the cart is positioned underneath the spreader tailgate.

With further reference to FIG. 1, the preferred embodiment of the present invention includes a means of securing the spreader tailgate 15, see FIG. 3, to the cart of a chain 7 and load rated clasp 8 whereby the chain 7 is passed through a lifting loop 25 and secured to itself with the clasp 8 to prevent tipping of the tailgate. The preferred embodiment of the present invention further includes a tray compartment 9 within the base 1 of the cart to receive hydraulic hoses or other lines such that said hoses or lines do not drag along the ground and remain within the space of the cart to reduce opportunity for pinching or kinking the lines. The preferred embodiment of the present invention also includes handles 10 for manually pushing or pulling the cart disposed on multiple sides of the cart. Further, the preferred embodiment of the present invention includes a means for directing a lift truck or similar equipment towards suitable lifting points on the cart. These means in the preferred embodiment of the present invention are tubular pockets 11 disposed on the underside of the cart base 1 and at positions which straddle the center of mass for both the empty cart and loaded cart. Tie down loops 12 are located at various points to facilitate securing the tailgate to the cart. The preferred embodiment of the present invention is constructed from carbon steel and joined in manners known to the art, but the cart could easily be made from any metal or other material with appropriate strength as determined by one skilled in the art.

Figure 2:
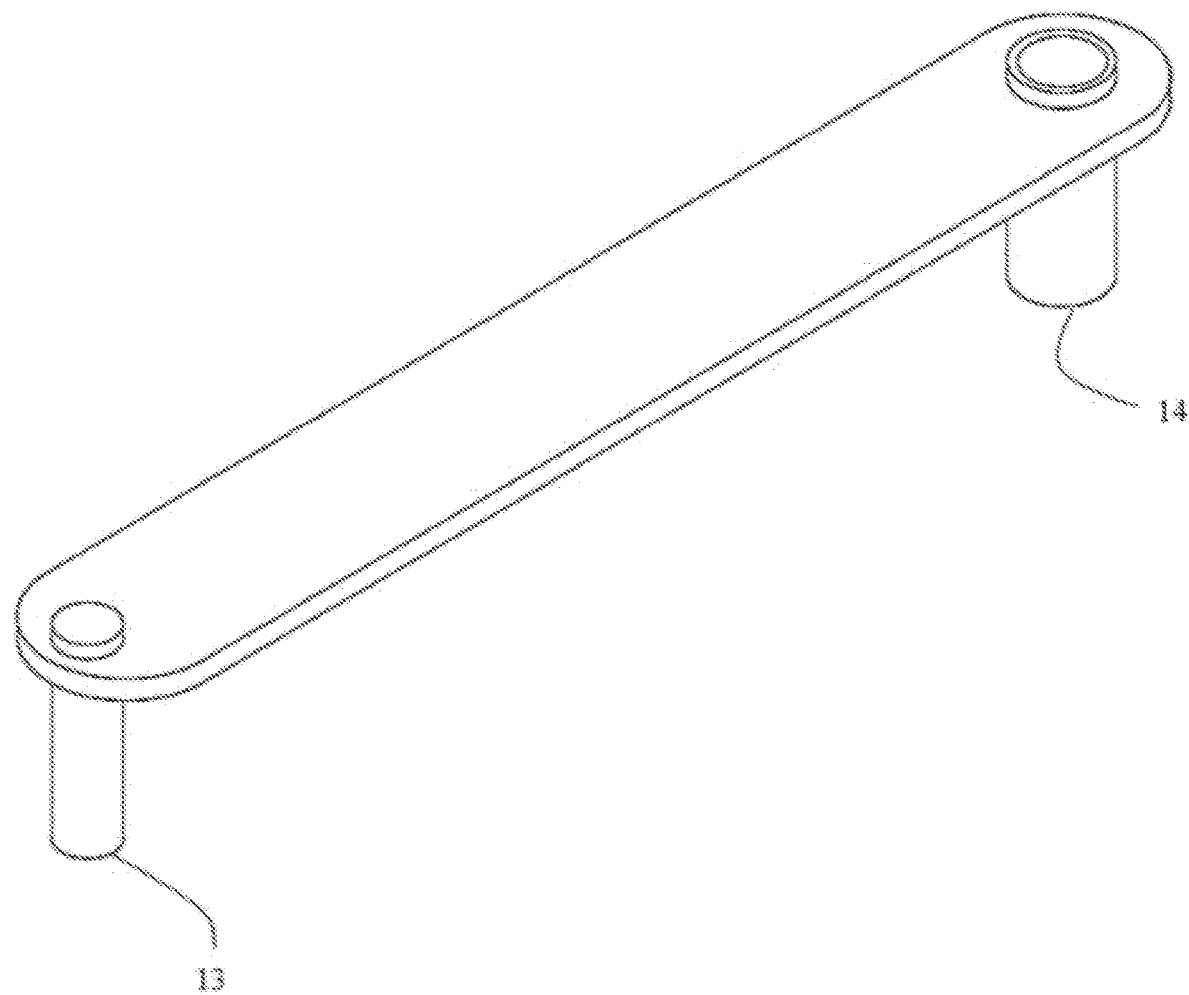
FIG. 2 is a perspective view of the prop of the present invention.
Figure 7:
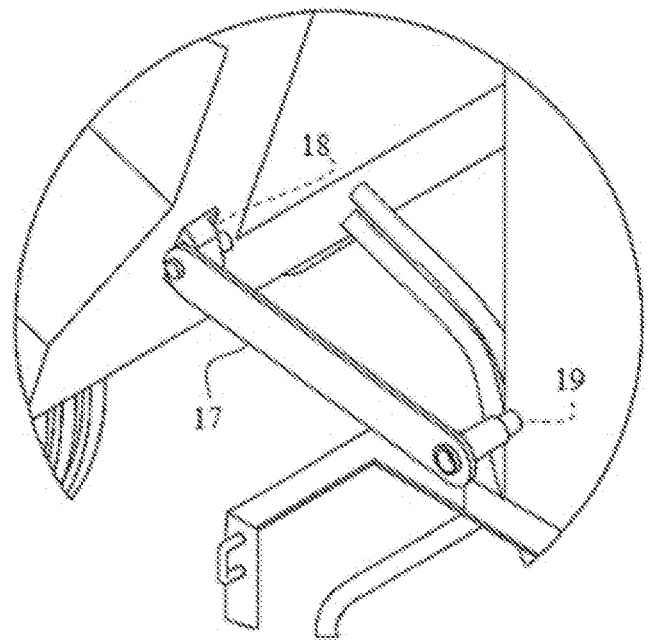
FIG. 7 is a detail view of FIG. 3 showing the prop ideally inserted.

With reference to FIG. 2, the prop of the present invention includes a member with two ends. The disclosed preferred embodiment of the present invention of the prop includes a first end with a perpendicular male protrusion 13 of a diameter near or slightly less than the diameter of the lower tailgate pin 19, see FIG. 7, and length near that of the tailgate pin 19 such that it will fit into the tailgate latching mechanism 18. The preferred embodiment of the present invention further includes a second end with a perpendicular pipe female protrusion 14 of an inside diameter slightly larger than the diameter of the tailgate pin 19 and similar length to the pin thereof such that it will receive the pin. The prop in the preferred embodiment of the present invention is constructed of mild steel by welding 3 pieces. The member has a hole in each end a distance apart which allows for easy insertion of the prop. The pipe and shaft protrude on both sides of the member but only slightly on one side. The pipe and shaft are welded on both sides of the member continuously around their circumference. The prop of the present invention, however, could easily be made from an array of materials including aluminum, stainless steel, etc. and using a variety of methods including casting, machining, drop forging, etc. by one skilled in the art.

Figure 5:
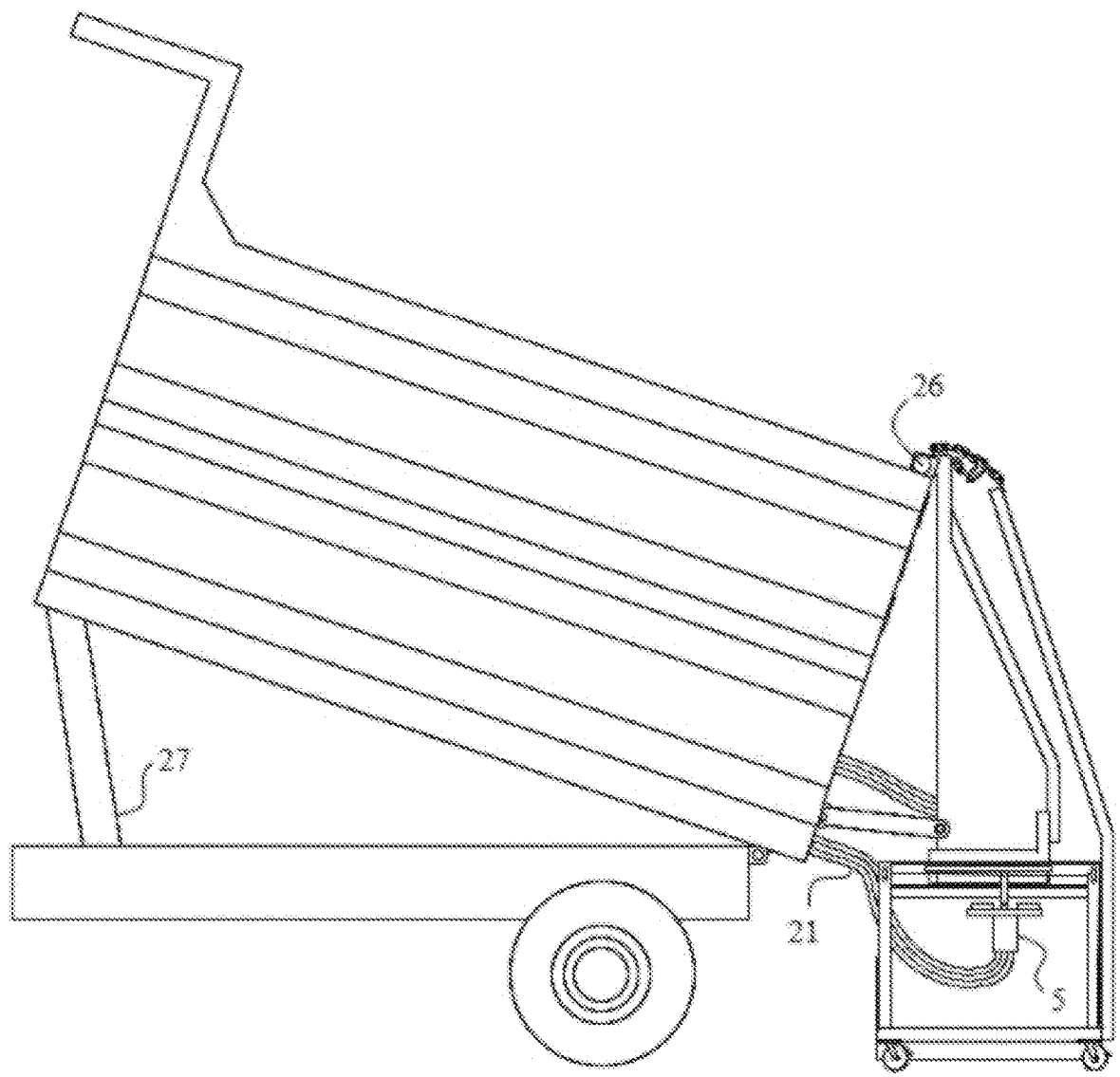
FIG. 5 is a left view of the same cart, prop, spreader tailgate, and dump body shown in FIG. 3.
Figure 6:
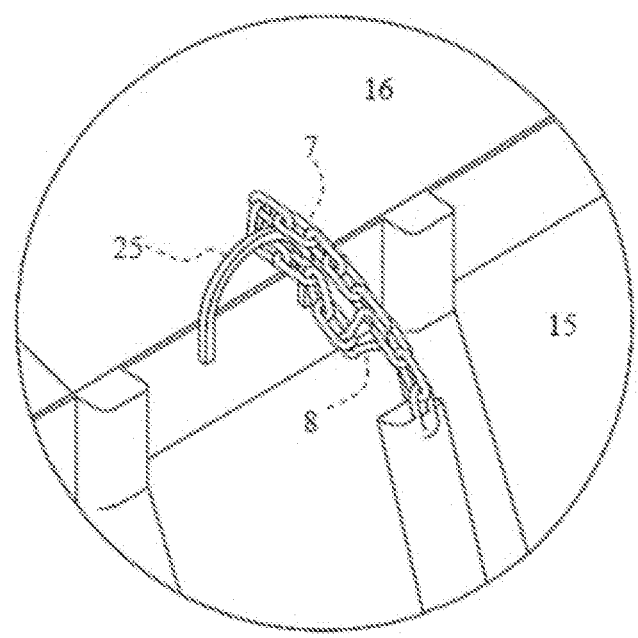
FIG. 6 is a detail view of FIG. 3 showing the integrated tie down means of the preferred embodiment.

With reference to FIG. 3, the preferred application of the present method requires a functioning hoist 27, see FIG. 5, spreader tailgate 15, a dump body 16, and the present invention. The present method comprises of three parts: removal, storage, and reinstallation of the spreader tailgate 15. To remove the spreader tailgate 15, the hoist 27 is operated, after disengaging the tailgate latch mechanism 18, to raise the dump body 16 making the spreader tailgate 15 pivot about a set of top pins 26, see FIG. 5. With the spreader tailgate 15 in the open position, the prop 17 is inserted between the spreader tailgate 15 and the dump body 16. The prop 17 of the preferred embodiment of the present invention is of length such that the bottom of the spreader tailgate 15 will be suspended parallel to the horizontal plane near the middle of the range of motion of the hoist 27 and dump body 16 when the male protrusion 13, see FIG. 2, is in the tailgate latch mechanism 18 and the female protrusion 14 is around a tailgate bottom pin 19, see FIG. 7. When the prop 17 is inserted, moving the hoist 27 and dump body 16 down will raise the height of the spreader tailgate 15 and raising the dump body 16 and hoist 27 will lower the height of the spreader tailgate 15. The spreader tailgate 15 may need to be manually pivoted about the top pins 26 to insert the prop 17. Once the prop 17 is secured, the dump body 16 and hoist 27 should be lowered such that the spreader tailgate 15 rotates upward providing greater clearance height beneath it. The prop 17 is held in the inserted position by the weight of the spreader tailgate 15. The tailgate latch mechanism 18 is closed to ensure the prop 17 is constrained in case the dump body 16 and hoist 27 are required to be raised above the position where the prop 17 had been inserted. The cart 20 then is positioned beneath the spreader tailgate 15. The dump body hoist 27, see FIG. 5, is raised rotating the spreader down toward the cart 20. As the spreader approaches the horizontal, the cart 20 may require adjustment or repositioning. The height of the support arms 3, see FIG. 1, of the cart 20 in the preferred embodiment of the present invention are near the height of the bottom edges of the spreader tailgate 15 as it approaches parallel to the horizontal plane. The dump body hoist 27 is raised until the spreader tailgate 15 contacts the cart 20 and its weight is transferred from the top pins 26, see FIG. 5, to the support arms 3 of the cart 20. While raising the hoist 27 to set the tailgate spreader 15 on the cart 20, the tailgate latch mechanism 18 may be opened allowing a greater degree of freedom to limit the possibility of crushing the cart 20 with the dump body hoist 27. With the weight of the tailgate spreader 15 on the cart 20, the tailgate spreader 15 is secured to the cart 20 using the tie down member 6 by looping the chain 7 through the lifting loop 25, see FIG. 6, on the spreader tailgate 15 and securing the clasp 8. Once secured to the cart 20, the top pins 26 of the tailgate are removed. Any hydraulic, electric, or other lines 21, see FIG. 5, are disconnected, and the spreader tailgate 15 is completely disconnected from the dump body.

Figure 4:
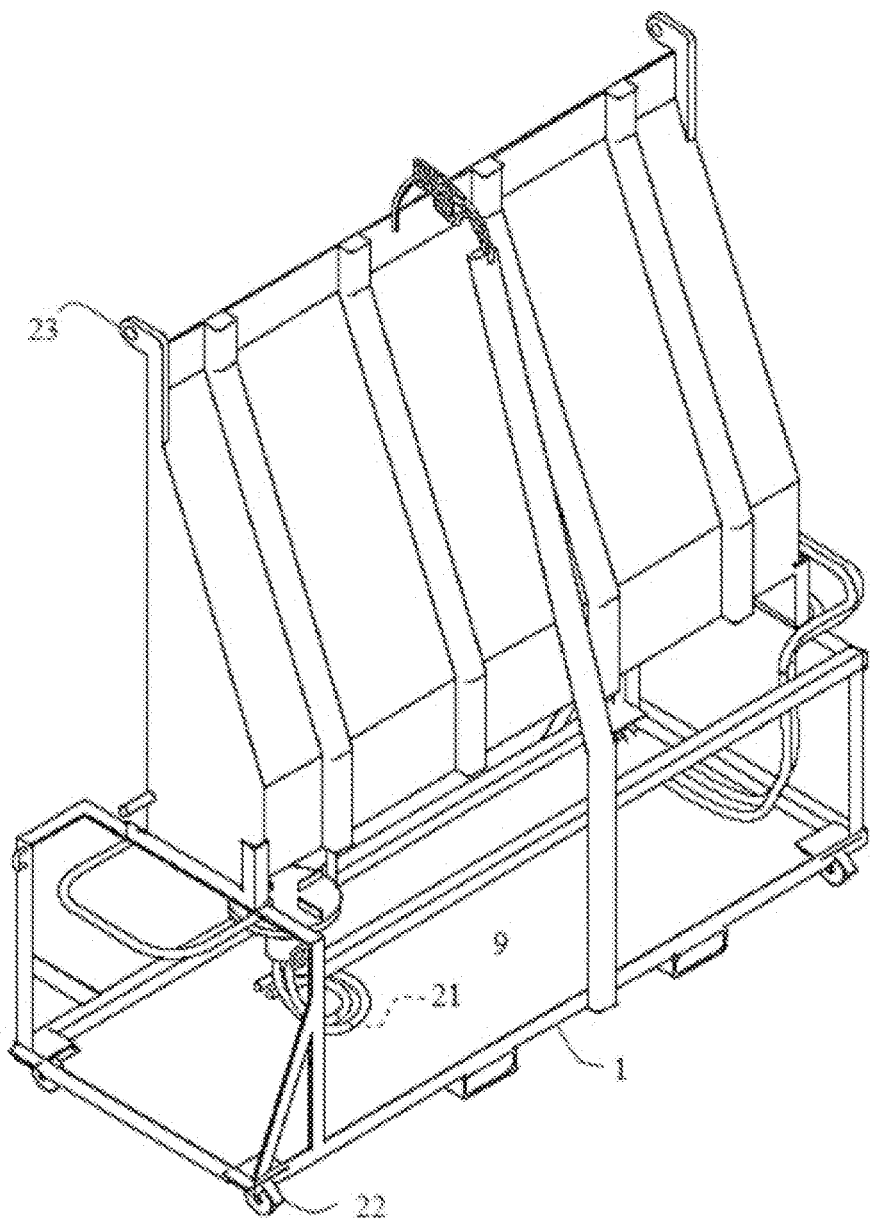
FIG. 4 is a perspective view of the spreader tailgate on the cart in the storage position.

With reference to FIG. 4, the preferred application of the present method for storage includes stowing hydraulic, electric, or other lines 21 and transporting the cart 20 to a desired location by means of pushing or pulling manually or by machine including a lift truck. Before moving the cart 20, the preferred embodiment of the present invention allows the hydraulic, electric, or other lines to be placed securely in the tray compartment 9 in the cart 20 base 1. Once at its desired location, the locking mechanism 22 of the locking caster wheels 2 of the preferred embodiment of the present invention is engaged to prevent undesired motion until motion is required later and the locking mechanism 22 is released.

With additional reference to FIG. 3, the preferred application of the present method includes a technique of reinstalling a spreader tailgate 15. The application includes positioning the loaded cart 20 at the rear of the dump body 16. The dump body hoist 27, see FIG. 5, is raised with tailgate latching mechanism 18, see FIG. 7, unlocked while the cart 20 is manipulated into position such that the female means of pivot 23 at the top of the spreader tailgate 15 are aligned with the female means of pivot 24 on top of the dump body 16. The spreader tailgate 15 top pins 26, see FIG. 5, are inserted, and the hoist 27 and dump body 16 are lowered. The weight of the spreader tailgate 15 is transferred from the cart 20 to the top pins 26 of the dump body 16 as the dump body 16 moves closer to the horizontal and raises the spreader tailgate 15. The hydraulic or other lines 21, see FIG. 4., are connected as necessary, and the tie down clasp 8 is removed. The cart 20 is then removed and positioned as desired. Finally, the dump body hoist 27 is lowered and the latching mechanism 18 is locked.

What is claimed is:

1. A method for removing, storing, and installing a spreader tailgate, comprising:
   removal comprising:
      preparing a dump body, equipped with the spreader tailgate, such that the spreader tailgate is only attached to the dump body at a set of top pivot features;
      holding the spreader tailgate such that it is away from a dump body but remains disposed pivotably to the dump body;
      inserting a prop between the spreader tailgate and the dump body;
      positioning a cart beneath the spreader tailgate;
      removing any hydraulic, electrical, or other lines;
      transferring weight of the spreader tailgate from the top pivot features of the spreader tailgate to the cart;
      disconnecting the top pivot features of the spreader tailgate from mating pivot features on the dump body;
   storing comprising:
      transporting the cart to a desired location;
      holding the spreader tailgate off the ground until its next use;
   installing comprising:
      positioning the spreader tailgate loaded on the cart behind the dump body;
      aligning the top pivot features on the spreader tailgate and the mating pivot features on the dump body;
      connecting the top pivot features of the spreader tailgate to their mating pivot features on the dump body;
      transferring the weight of the spreader tailgate from the cart;
      connecting any hydraulic, electrical, or other lines.

2. The method of claim 1, wherein the holding the spreader tailgate such that it is away from a dump body but remains disposed pivotably to the dump body step further comprises:
   controlling the radial position of the spreader tailgate relative to the dump body using a hoist fitted between the dump body and a chassis to which the dump body is mounted.

3. The method of claim 2, wherein the transferring weight of the spreader tailgate from top pins of the spreader tailgate to the cart step further comprises:
   using a hoist to transfer the weight.

4. The method of claim 3, further comprising:
   using an integrated tie down means to secure the tailgate during storage or transport.

5. The method of claim 4, wherein the transferring the weight of the spreader tailgate from the cart step further comprises:
   using a hoist to transfer the weight.

6. The method of claim 2, further comprising:
   using an integrated tie down means to secure the tailgate during storage or transport.

7. The method of claim 2, wherein the transferring the weight of the spreader tailgate from the cart step further comprises:
   using a hoist to transfer the weight.

8. The method of claim 1, wherein the transferring weight of the spreader tailgate from top pins of the spreader tailgate to the cart step further comprises:
   using a hoist to transfer the weight.

9. The method of claim 8, further comprising:
   using an integrated tie down means to secure the tailgate during storage or transport.

10. The method of claim 9, wherein the transferring the weight of the spreader tailgate from the cart step further comprises:
    using a hoist to transfer the weight.

11. The method of claim 8, wherein the transferring the weight of the spreader tailgate from the cart step further comprises:
    using a hoist to transfer the weight.

12. The method of claim 1, further comprising:
    using an integrated tie down means to secure the tailgate during storage or transport.

13. The method of claim 12, wherein the transferring the weight of the spreader tailgate from the cart step further comprises:
    using a hoist to transfer the weight.

14. The method of claim 1, wherein the transferring the weight of the spreader tailgate from the cart step further comprises:
    using a hoist to transfer the weight.

* * * * *